Figure 1:
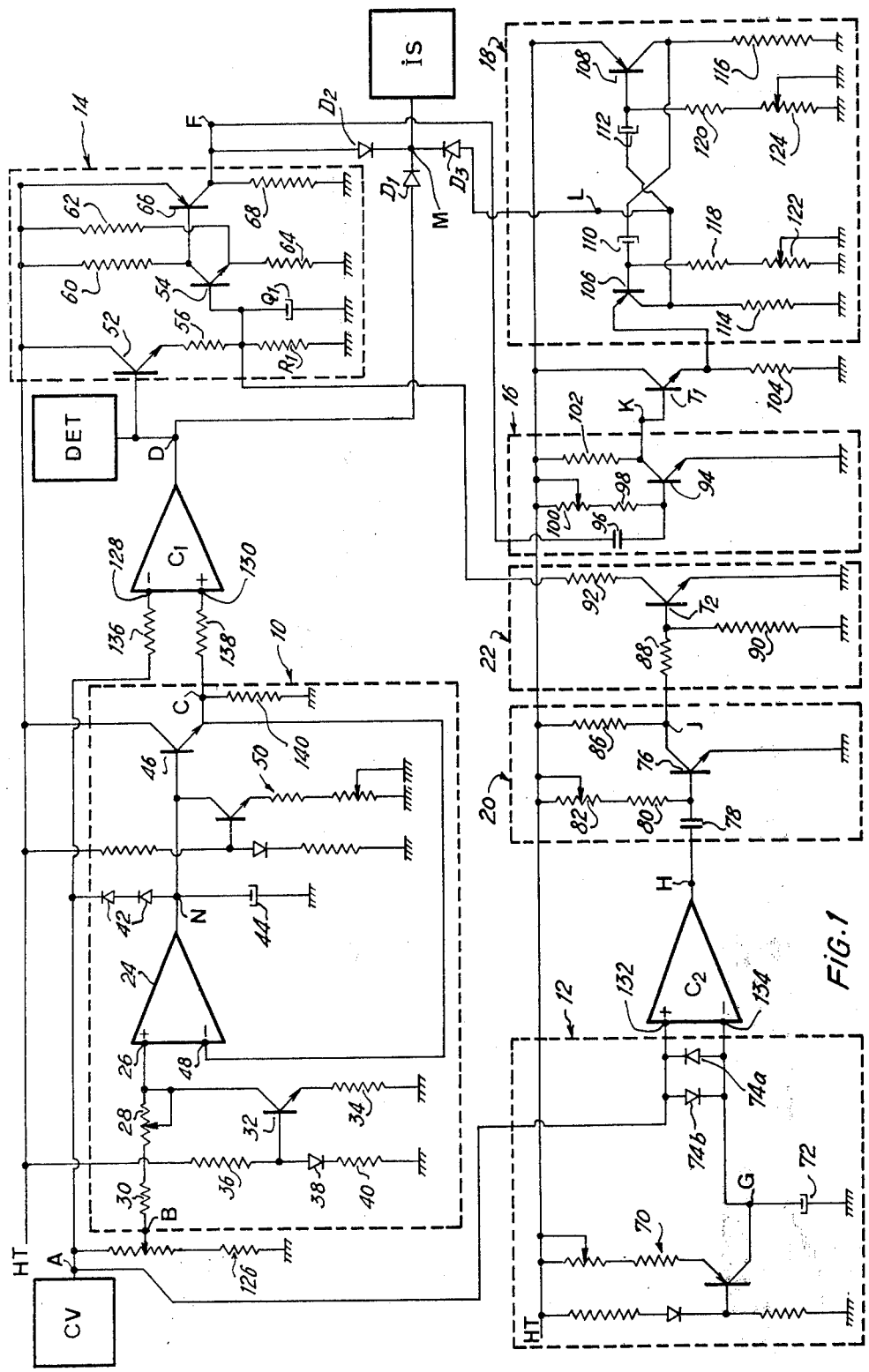

United States Patent [19]

Marouby

[11] 3,955,854
[45] May 11, 1976

[54] ELECTRONIC CONTROL UNIT FOR AN ANTISKID BRAKE SYSTEM OF A VEHICLE

[75] Inventor: Guy Marouby, Neuilly, France

[73] Assignee: Societe Anonyme D.B.A., Paris, France

[22] Filed: Feb. 19, 1975

[21] Appl. No.: 551,176

[30] Foreign Application Priority Data
  Mar. 6, 1974  France ............................ 74.07557

[52] U.S. Cl. .............................. 303/21 BE; 303/20
[51] Int. Cl.² ............................................ B60T 8/10
[58] Field of Search ...................... 180/82 R, 105 E; 188/181 C; 235/150, 2; 303/20, 21; 307/10 R; 317/5; 324/161; 328/115; 340/53, 62, 263

[56] References Cited
UNITED STATES PATENTS

| | | | |
|---|---|---|---|
| 3,700,920 | 10/1972 | Eyler | 328/115 |
| 3,713,705 | 1/1973 | Michellone et al. | 303/21 P |
| 3,776,357 | 12/1973 | Arai et al. | 180/82 R |
| 3,807,811 | 4/1974 | Nakamura et al. | 303/21 BE |
| 3,883,187 | 5/1975 | Carp et al. | 303/218 |

*Primary Examiner*—Trygve M. Blix
*Assistant Examiner*—Stephen G. Kunin
*Attorney, Agent, or Firm*—Ken C. Decker; W. N. Antonis

[57] ABSTRACT

The invention relates to an electrical control unit for a wheeled vehicle. A decay valve is energized by means of a generator which delivers a control signal resulting from the comparison between a speed signal and a reference signal derived from the speed signal. An isolation valve is energized by the signal at the output of monostable apparatus having a predetermined time period and initiated by the leading edge of the control signal. The signal at the output of the monostable apparatus can be interrupted before the end of its time period upon generation of a signal resulting from comparison of the speed signal and a signal increasing linearly. The isolation valve is further controlled by the signal at the output of the generator and also a signal at the output of multivibrator apparatus.

10 Claims, 2 Drawing Figures

ELECTRONIC CONTROL UNIT FOR AN ANTISKID BRAKE SYSTEM OF A VEHICLE

The invention relates to an electronic control unit for an antiskid brake system for vehicles, of the three-phase type in which, when one of the vehicle wheels is threatening to lock, the pressure in the brake actuators associated with this wheel is reduced, then maintained and finally reapplied.

Antiskid brake circuits for motor vehicles generally have an assembly of antiskid valves controlled by signals from an electronic control unit. The electronic control unit usually receives information from one or more speed sensors mounted on the vehicle. The sensors are associated with frequency-to-voltage converters and supply voltage signals representing the speeds of the monitored wheels at an instant. Once the speed signals have entered the electronic control unit they are almost always differentiated to give acceleration signals for comparison with predetermined voltages representing given accelerations, so as to generate signals for the antiskid valve assembly when the acceleration of a monitored wheel at an instant fulfils a predetermined condition.

It has been recognized, in the case of electronic control units of this type, that vibrations at the speed sensor level would generate undesired signals, usually fairly brief, but superimposed on the speed signal. These undesired signals are amplified during electronic differentiation and give rise to inappropriate anti-skid signals at the acceleration signal level. This occurs especially during reacceleration of the wheel, with the result that the advantages of three-phase anti-skid brake systems are partly cancelled out by the difficulty of accurately determining the best times to stop relieving the brake pressure and to begin reapplying it.

The invention proposes an electronic control unit for an anti-skid brake system of the three-phase type, capable of monitoring the speed signal in an instantaneous fashion. In particular, the invention makes it possible to eliminate the signal which causes pressure to be maintained when it has been possible to verify (without however differentiating the speed signal) that the acceleration of the wheel which was threatening to lock has reached a predetermined level and has then fallen back below this predetermined acceleration level.

The invention therefore consists of an electronic control unit for an anti-skid brake system for a wheeled vehicle, of the three phase type, adapted to control a modulating device comprising an isolation valve and a relief valve mounted between a set of brake actuators in the vehicle and a source of brake pressure, said control unit comprising a first voltage generator capable of supplying a first signal representing the speed of at least one wheel of the vehicle, a second voltage generator capable of supplying a second signal which is a function of the first signal, a first comparing device for colparing said first and second signals and generating a third signal when said first and second signals bear a predetermined relation, a control device responsive to the third signal for controlling actuation of said isolation and relief valves, the control unit further comprising a third voltage generator, capable of supplying a fourth signal increasing linearly with time, a second comparing device the first and second inputs of which are respectively supplied with the first and fourth signals, a voltage limiting device being inserted between the two inputs of said second comparing device, said comparing device being capable of generating a fifth signal when a predetermined condition between the first and fourth signal is fulfilled, the control means including a monostable isolation device capable of generating a sixth signal an appearance of the third signal for actuating the isolation valve, the monostable isolation device being controlled by the value of the charge of the capacitor of an RC circuit, a switching device responsive to termination of the fifth signal controlling the discharge of said capacitor, thereby eliminating said sixth signal.

In a preferred embodiment of the invention, the discharge switching means is controlled by a monostable maintaining device and is maintained closed for a predetermined time after termination of the fifth signal.

The latter feature makes it possible for a predetermined time, of the order of one tenth of a second, to prevent a very brief relief signal from resetting the monostable isolation device and thereby initiating another pressure maintenance phase. For, as will be seen below, it is possible though rare, to have very brief relief signals caused by interference shortly after the vehicle wheel has finished reaccelerating. If, however, these very brief relief signals do not continue more than one tenth of a second after the monostable isolation device has been reset to zero, it is not desirable to begin another pressure maintenance phase and so to operate the monostable isolation device again.

Figure 2:
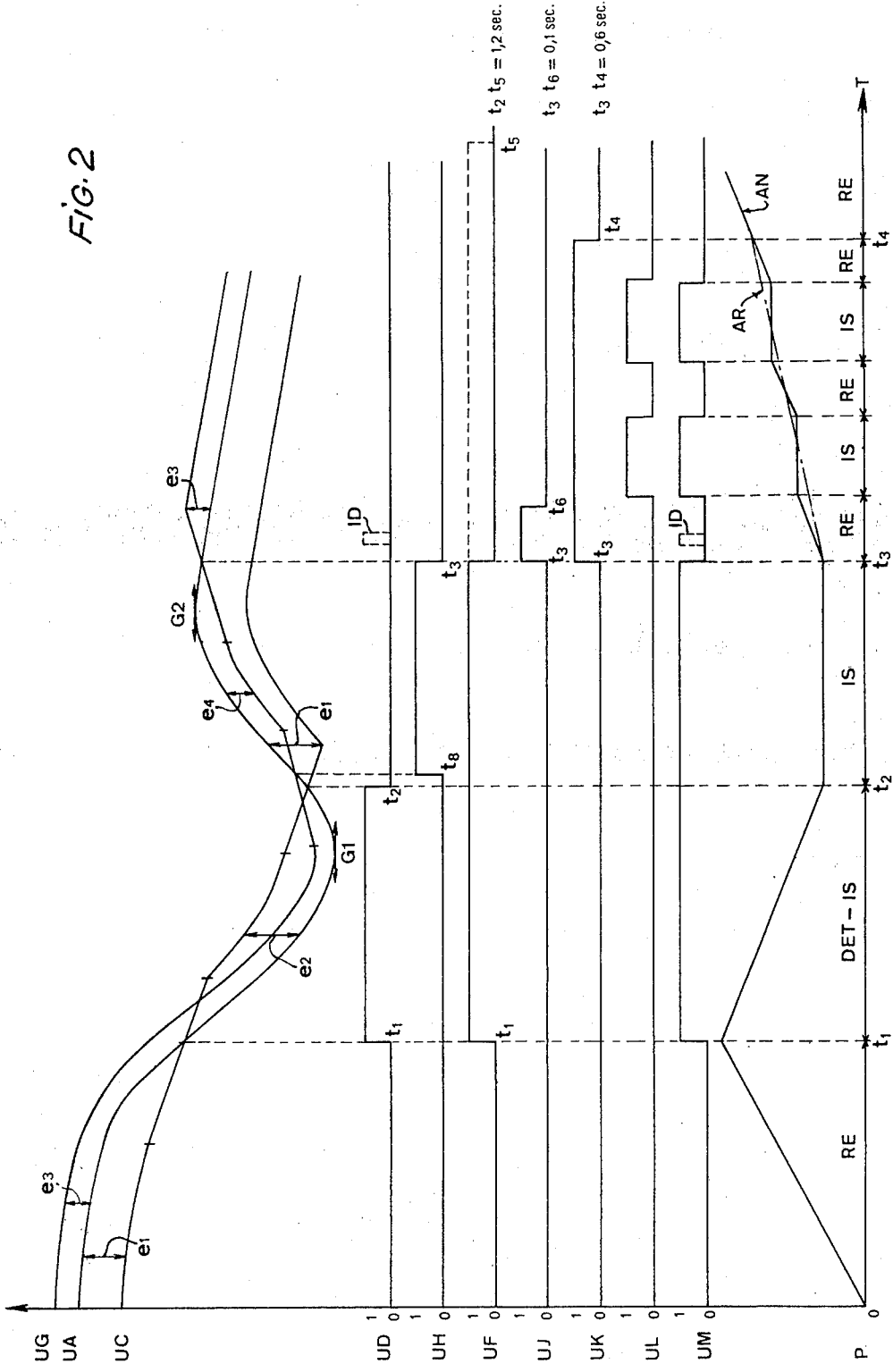

The invention will be better understood from the ensuing description, referring to the accompanying drawings, in which:

FIG. 1 represents a circuit diagram for the control unit for an antiskid vehicle brake system embodying the invention; and FIG. 2 is a graph in which the abscissae represent time and the ordinates represent the voltages at various points in the circuit of the electronic unit shown in FIG. 1.

The electronic control unit illustrated in FIG. 1 comprises a voltage generator CV supplying at its output A a voltage signal representing the speed of at least one wheel of the motor vehicle at an instant. By way of example, the voltage at A can be obtained from at least one speed sensor of the electromagnetic type, connected to a frequency-to-voltage converter of any known type. In accordance with a conventional anti-skid braking technique, the or each sensor is arranged either to monitor one or more vehicle wheels separately (a speed selection device being provided if there is more than one sensor), or to monitor a plurality of wheels by measuring the rotational speed of the transmission shaft where it enters the differential.

The voltage signal at A is fed to four different points: to the first input 128 of a comparator C1; to the input B of a voltage generating unit 10 by way of a voltage divider bridge 126; to the input of another voltage generator 12; and to the first input 132 of a second comparator C2. The voltage generator 12 delivers at its output G a voltage fed to the second input 134 of the comparator C2. The second input of the comparator C1 receives the voltage supplied at the output C of the generator 10. The output D of the comparator C1 is connected both directly to the input of an amplifier DET effecting energization of the coil of a solenoid relief valve, and by way of a diode D1 to the input M of an amplifier IS effecting energization of the coil of a solenoid isolation valve. Lastly, the output D is connected to the input of a monostable device 14 which, as explained below, controls the duration of energization of the solenoid isolation valve. The output F of the monostable device 14 is connected by a diode D2 to the point M and to the input of a monostable restriction-time device 16, whose output K controls a supply switch T1 which in turn controls the high-tension supply to one input of a multivibrator 18. The output L of the multivibrator 18 is connected by a third diode D3 to the point M. The output H of the comparator C2 is connected to the input of a monostable maintaining device 20, of which the output J controls a gate 22 consisting primarily of an NPN transistor T2 and capable of effecting rapid discharge of a capacitor Q1 which controls the duration of the active phase of the monostable 14.

The amplifiers DET and IS control energization of the coils of the solenoid relief and isolation valves respectively. These valves are incorporated in a modulating device of any known type, installed conventionally between a brake pressure source and a set of brake actuators in the vehicle. The modulating device will not be described in detail here. We shall merely state that when the coil of the solenoid isolation valve is energized, the brake actuator set is isolated from the brake pressure source, and when the coil of the solenoid relief valve is energized, the pressure in the brake actuator set is reduced, either due to a direct connection between the brake actuator set and a low pressure reservoir, or due to motion of a plunger piston in a direction such as to increase the space available to the given quantity of fluid trapped in the brake actuator set.

Having listed the principal components of the electronic control unit, we shall consider the structure and operation of each of them in more detail. To facilitate understanding, FIG. 2 plots against time the value of the voltage signal at various particular points defined in the description of FIG. 1. For example, the voltage signal at the point A is represented by the curve reference UA.

In FIG. 2, the voltage UA represents the speed of at least one wheel of the vehicle. In addition, at the bottom of FIG. 2, P represents very diagrammatically the variation in the brake pressure in the brake actuators associated with the wheel whose speed signal is represented by the curve UA. Let us assume that the vehicle is braked at the instant 0 in FIG. 2. The pressure in the brakes will increase regularly and permit braking of the vehicle. The curve UA therefore has a gently descending portion. When the brake pressure is too high for the adhesion of the vehicle's tyres to the ground, the wheel threatens to lock and the curve UA therefore descends rapidly, producing at the instant $t1$ a signal to relieve the brake pressure. The voltage UA will then diminish to a minimum G1 and then rise again. The brake pressure relief will be stopped by means discussed below at an instant $t2$, fairly close to the instant at which the voltage UA passed its minimum G1. A maintenance period then ensues, during which the brake pressure in the brake actuator set is maintained at a fixed value. During this maintenance period the voltage UA increases to a maximum G2 and then decreases substantially linearly. Shortly after the maximum G2 has been passed, the maintenance period is concluded at $t3$, and a pressure reapplication period begins. For reasons given below, this reapplication period can be divided into a transitional period $t3-t4$ of predetermined duration, during which the pressure rises slowly, and a normal application period which will continue until a subsequent risk of locking is detected.

Having outlined an antiskid cycle for an antiskid brake system of the three-phase type, we shall turn to the generation of reference signals UC and UG which enable the three critical instants $t1$, $t2$ and $t3$ on the curve UA to be determined without recourse to electronic differentiation of the signal UA.

The voltage generator 10 comprises a differential amplifier 24 of unity gain, of which the "non-inverting" input 26 is connected by a potentiometer 28 and resistance 30 to the input terminal B of the generator 10. The input 26 is also connected to the collector of an NPN transistor 32, whose emitter is earthed by a resistance 34 and whose base is connected to a stable voltage source created by a first constant-current circuit, comprising a resistance 36, diode 38 and resistance 40. The output N of the amplifier 24 is connected to the terminal A by two silicon diodes 42 connected in series, to earth by a capacitor 44, and to the base of an NPN transistor 46, whose collector is connected to the high-tension source and whose emitter is connected to the "inverting" input 48 of the differential amplifier. Between the terminals of the capacitor 44 there is a second constant-current circuit 5 well known in the art, capable of effecting substantially linear discharge of the capacitor 44. The constant-current circuit 50 and capacitor 44 thus form a voltage generator whose signal decreases as a function of time. The output terminal C of the generator 10 is connected to the collector of the transister 46 and to earth by a resistance 140.

The voltage generator 10 operates as follows. When braking begins, the voltage at the terminal 26 is greater than that at the terminal 48, so that the differential amplifier 24 delivers an output signal at N which is looped back to the "inverting" input 48 of the amplifier 24 by way of the transistor 46, giving the signal UC which, though lower than the signal UA, follows the latter throughout the first braking phase. The difference $e1$ between UC and UA allows for both a fixed voltage difference due to the first constant-current circuit, including the resistances 30, 28, and a variable voltage difference proportional to the voltage at the point A and due to the presence of the divider bridge 126 at the input B of the generator 10.

Let us assume that the voltage at the point A now decreases rapidly, much more rapidly than the voltage variation at the terminals of the capacitor 44 which depends on the second constant-current circuit 50. The curve UC will now descend linearly, until the moment at which the voltage at point N exceeds, by the threshold of one of the two diodes 42, the voltage at the point A. The two diodes now become conductive, and the voltage UC will follow the voltage UA, but will continue to exceed it by a fixed difference which is function of the conduction threshold $e2$ of one of the two diodes 42 mounted in series, viz. approximately 0.5 V, the other diode compensating for the voltage drop in the base-emitter junction of transistor 46. As the point G1 approaches, UA decreases more and more slowly, so that the two curves UA, UC become closer together, and the diode 42 are blocked. From this moment the variation in the voltage UC is controlled by the discharge of the capacitor 44 and is again substantially linear. This linear portion of the curve ends when the difference $e1$ is restored, and the curve UC follows the curve UA again, while maintaining a substantially constant distance from it during the period of time considered in relation to this curve.

The voltages UA, UC are fed through two resistances 136, 138 respectively to the two input terminals 128, 130 of the comparator C1, which takes the form of a high-gain differential amplifier and supplies a signal at the point D when the voltage UC is greater than the voltage UA. A positive voltage step UD therefore occurs between the instants $t1$ and $t2$ and is fed to the relief amplifier DET and to the isolation amplifier IS. The appearance of the signal UD indicates that the acceleration of the wheel at an instant has exceeded a predetermined level, and that this condition is fulfilled without differentiating the speed signal UA electronically. The termination of the signal, on the other hand, indicates that the wheel speed has passed its minimum G1, corresponding to zero acceleration, and this condition also is fulfilled without electronic differentiation of the wheel speed UA.

The structure and operation of the monostable isolation device 14 will now be described. The latter coomprises a first NPN transistor 52 of which the base is connected to the terminal D, the collector to the high tension HT and the emitter to the base of a second NPN transistor 54 by a resistance 56. The base of the transistor 54 is connected to earth both by the capacitor Q1 and by a resistance R1. The high tension source is connected to the collector of the transistor 54 by a resistance 60 and to the emitter of the same transistor by a resistance 62. The emitter of the transistor 54 is earthed by a resistance 64, and the collector of the transistor 54 is connected to the base of a PNP transistor 66, of which the emitter is connected to the high tension source whereas its collector is earthed by a resistance 68 and represents the output terminal F of the monostable device 14. The device 14 is moved into its operative position when the voltage step UD appears (instant $t1$). It is maintained in this position throughout the voltage step (interval $t1$–$t2$), remaining there after the cancellation of the voltage step UD at most for a time $t2$ to $t5$ corresponding to the time constant of the monostable device. This time constant, determined by the discharge of Q1 into R1, is fairly long, for example of the order of 1.2 seconds, and represents the duration of a very long antiskid cycle such as occurs in a vehicle in exceptional cases. UF represents the voltage signal at the terminal F; however, for reasons about to be given, this signal is not generally extended to the instant $t5$. The output signal of the monostable device may be stopped by earthing the capacitor Q1.

This is done by means of the voltage generator 12, the monostable device 20 and the gate 22 in the capacitor's discharge circuit.

The voltage generator 12 can generate at the point G another reference voltage UG which will be compared to the tension UA by the comparator C2. The comparator C2 is another differential amplifier and supplies a voltage step at H when the voltage UA exceeds the voltage UG. The voltage generator 12 consists essentially of a generator of a linearly increasing voltage, comprising a constant-current circuit 70 capable of charging a capacitor 72 connected between the terminal G and earth. The voltage A is fed to the "non-inverting" input 132 of the amplifier C2, whereas this voltage G is fed to the "inverting" input 134 of this amplifier. Between the two inputs 132, 134 two diodes 74a and 74b are connected in parallel, but with opposite directions of conduction. The operation of the generator 12 and of the comparator C2 is fairly similar to the operation of the generator 10 and comparator C1 and will not be described in detail here. When braking begins, the voltage at G exceeds the voltage at A by a value equal to the threshold $e3$ of the diode 74a, which is conductive. When the rate of increase of the voltage at A exceeds a predetermined rate depending on the constant-current circuit 70, the diode 74a is blocked, the voltage at G is determined by the charge of the capacitor 72, and the curve UG becomes linear. The difference between the two curves UA, UG diminishes until an instant $t8$ at which the voltage UA exceeds the voltage UG. A positive voltage step appears at H. When the difference between UA and UG attains the threshold $e4$ of the diode 74b the latter becomes conductive. The curve UG again follows the curve UA until the rate of increase of the voltage UA falls back below the predetermined value. The diode 74b is blocked, and the voltage UG depends on the charge of the capacitor. At the instant $t3$ the two curves UA, UG intersect again, and the signal UH disappears. The falling edge of the step UH then moves the monostable device 20 into its unstable position. The monostable device 20 consists primarily of an NPN transistor 76 whose base is connected to the output H of the comparator C2 by a capacitor 78 and to the high tension source by a resistance 80 and a variable resistance 82. The emitter of the transistor 76 is connected to earth, whereas its collector, which acts as the output terminal J of the device 20, is connected to the high tension source by a resistance 86. The terminal J of the device 20 is connected to the gate circuit 22, more particularly to the base of the transistor T2 by a resistance 88. The base of the transistor T2 is also connected to earth by a resistance 90, whereas its emitter is connected to earth and its collector is connected to the base of the transistor 54 of the monostable device 14 by a resistance 92. As a result, when a positive voltage signal appears at the terminal J (step UJ in FIG. 2), the transistor T2 will become conductive, so that the capacitor Q1 remains at earth for a predetermined time, for example of the order of one tenth of a second, depending on the time constant of the monostable device 20. The special significance of this signal UJ will be considered later. Naturally, the appearance of the step UJ, which causes the capacitor Q1 to be earthed, returns the monostable device 14 to its idle position and cancels the voltage step UF. The isolation phase of the anti-skid cycle is now terminated and is followed by a phase during which the pressure is reapplied. Over a transitional period determined by the monostable device 16, the multivibrator 18 initiates a succession of pressure applications and isolations. At the end of the transitional period the application of pressure becomes continuous.

The monostable device 16 comprises an NPN transistor 94 of which the base is connected by a capacitor 96 to the collector of the PNP transistor 66 (terminal F of the monostable device 14) by a resistance 98 and a variable resistance 100 to the high tension source. The emitter of the transistor 94 is connected to earth, whereas its collector (terminal K) is connected both to the high tension source by a resistance 102 and to the base of the transistor T1. The transistor T1 acts as a supply switch. Its collector is connected to the high tension source, and its emitter is connected to earth by a resistance 104 and to the emitter of the transistor 106 and multivibrator 18. The multivibrator contains two PNP transistors 106, 108. The emitter of the transistor 108 is connected to the high tension source HT. The base of the transistor 106 is connected to the collector of the transistor 108 by a capacitor 110, whereas the base of the transistor 108 is connected to the collector of the transistor 106 by a capacitor 112. The collectors of both transistors 106, 108 are connected to earth by two resistances 114, 116 respectively. Similarly, the bases of both transistors 106, 108 are connected to earth by two resistances 118, 120 arranged in series with two variable resistances 122, 124. The collector of the transistor 106 forms the output terminal of the multivibrator (terminal L) and is connected to the input M of the isolation amplifier IS by the diode D3. The monostable device 16 is moved into its unstable position by the falling edge of the voltage step UF. This causes a positive voltage step to appear at the point K at the instant $t3$. The step continues for a predetermined time, for example 0.6 seconds. During the period $t3$ to $t4$ pressure will be reapplied to a reduced extent due to the action of the multivibrator 18. The multivibrator will produce a series of pulses at L and these will be fed to the amplifier IS for the solenoid isolation valve.

It should also be noted that the signal UD corresponds to energization of the coil of the solenoid relief valve and that the signal UM, which superimposes the signals UD, UF and UL by means of the diodes D1, D2 and D3, corresponds to energization of the coil of the solenoid isolation valve. Considering the generation of the brake pressure curve P in the set of brake actuators associated with the wheel which was threatening to lock, three possibilities are found.

Firstly, the coils of the solenoid isolation and relief valves are not energized. The brakes are therefore connected directly to the brake pressure source, and the curve P increases during time intervals bearing the reference RE.

Secondly, the coils of the solenoid isolation and relief valves are energized. The pressure P therefore decreases during a time interval designated DET-IS.

Thirdly, only the coil of the isolation valve is energized, so as to keep the pressure P constant during time intervals bearing the reference IS.

It will also be noted that the presence of the multivibrator 18 leads to a restricted pressure rise at the beginning of the pressure reapplication phase. In FIG. 2 the average rate of pressure rise during the interval $t3-t4$ (the rate indicated by the rectilinear curve portion AR) can be compared with the normal average rate of pressure rise indicated by the rectilinear portion AN, which of course depends on the delivery pressure of the brake pressure source. The restriction effect is controlled quantitatively by the length of the time constant of the monostable device 16 and by the characteristics of the multivibrator, which determine the duration of the pulses.

The control unit just described makes it possible, by continuously monitoring the voltage curve UA, to detect predetermined wheel acceleration levels without using electronic differentiation. This result may be used profitably in an electronic antiskid brake system of the three-phase type. In particular, the isolation signal is curtailed if on the one hand reacceleration of the wheel has exceeded a predetermined rate and if on the other hand this reacceleration has fallen back below the predetermined rate, which in effect corresponds to the end of reacceleration. Thus the generation of the "conclude-isolation" signal is obtained directly from the wheel speed signal, under conditions which eliminate practically all disadvantages due to vibration at the speed sensor level, so that the principle of mounting a single speed sensor at the entrance to the differential can be applied without any difficulty. Moreover, the control unit contains a monostable device (device 20) which for predetermined time (one tenth of a second) can prevent resetting of the monostable device maintaining the isolation signal. For it is possible for interference shortly after the instant $t3$ to give rise to an excessively short relief signal which appears on the curve UD as a pulse ID, found also on the curve UM. If the pulse ID occurs during the time interval $t3-t6$, a small step appears on the curve P, but the monostable isolation device will not be reset. If on the other hand the pulse ID occurs after or continues after the instant $t6$, it can be regarded as inndicating a new risk of locking for which a complete antiskid cycle should be carried out.

What is claimed is:

1. An electronic control unit for an anti-skid brake system of a vehicle, of the three-phase-type, comprising a modulating device including a solenoid isolation valve and a solenoid relief valve adapted to be mounted between a set of brake actuators in the vehicle, and a source of brake pressure, the control unit further comprising means for generating a first signal representative of the speed of at least one wheel of a vehicle, means responsive to the value of the first signal for generating a speed reference signal, first comparing means for comparing said first signal with said speed reference signal and for generating a third signal when a predetermined condition relating to the comparison of said first signal and said speed reference signal is fulfilled, control means for energizing said isolation and relief valves in response to generation of said third signal, means for generating a fourth signal, said fourth signal tending to increase linearly with time, second comparing means of which one input receives the first signal and the other input receives the fourth signal, said second comparing means generating a fifth signal when a predetermined condition between the first and fourth signals is fulfilled, a voltage limiting device being inserted between the two inputs of the second comparing means, said control means including a monostable isolation device for generating a sixth signal on appearance of the third signal, said sixth signal being fed to the input of an isolation amplifier controlling actuation of the isolation valve, a discharge switching means being responsive to termination of the fifth signal for terminating the sixth signal.

2. An electronic control unit as claimed in claim 1, wherein the voltage limiting device consists of two one way conduction elements arranged in parallel between the inputs of the second comparing means, and conducting in opposite directions.

3. An electronic control unit as claimed in claim 1, wherein the monostable isolation device is controlled by an RC circuit with a capacitor, said capacitor being discharged in response to termination of the fifth signal, thereby terminating the sixth signal.

4. An electronic control unit as claimed in claim 1, further comprising a second monostable device responsive to said fifth signal for controlling actuation of said discharge switching means.

5. An electronic control unit as claimed in claim 4 wherein the time constant of the second monostable device is approximately one tenth of a second.

6. An electronic control unit as claimed in claim 1, further comprising a third monostable device respoonsive to the sixth signal, a multivibrator supplying an output signal to the input of an isolation amplifier adapted to control actuation of said solenoid isolation valve, said third monostable device controlling the electrical connection between a voltage source and the multivibrator so that the latter is supplied for a predetermined time after termination of the sixth signal.

7. An electronic control unit as claimed in claim 6, wherein the third signal, the sixth signal and the multivibrator output signal are each supplied to the isolation amplifier by way of diodes, said diodes being arranged in parallel.

8. An electronic control unit as claimed in claim 1, wherein the means for generating a speed reference signal comprise a differential amplifier having an inverting input and a non-inverting input, the output of said differential amplifier being connected to the output of the means for generating a first signal by one-way conduction means and to means for generating a signal decreasing linearly with time, and also to the base of a transistor controlling the voltage at the inverting input of the differential amplifier, the non-inverting input of the latter being connected to the output of the means for generating the first signal by a voltage divider bridge.

9. An electronic control unit as claimed in claim 8, comprising between the voltage divider bridge and the "non-inverting" input of the differential amplifier a device for producing a fixed voltage difference.

10. An electronic control unit as claimed in claim 9, wherein the device for producing a fixed voltage difference comprises a resistance supplied by a constant-current circuit.

* * * * *